(12) United States Patent
Affolter et al.

(10) Patent No.: US 11,969,115 B2
(45) Date of Patent: Apr. 30, 2024

(54) ADAPTER FOR USE IN THE PREPARATION OF A BEVERAGE

(71) Applicant: DELICA AG, Birsfelden (CH)

(72) Inventors: Roland Affolter, Möriken (CH); Tim Thilla, Weil am Rhein (DE); Markus Brönnimann, Hermrigen (CH)

(73) Assignee: Delica AG, Birsfelden (CH)

( * ) Notice: Subject to any disclaimer, the term of this patent is extended or adjusted under 35 U.S.C. 154(b) by 635 days.

(21) Appl. No.: 16/492,274

(22) PCT Filed: Feb. 8, 2018

(86) PCT No.: PCT/EP2018/053174
§ 371 (c)(1),
(2) Date: Sep. 9, 2019

(87) PCT Pub. No.: WO2018/162167
PCT Pub. Date: Sep. 13, 2018

(65) Prior Publication Data
US 2021/0100394 A1   Apr. 8, 2021

(30) Foreign Application Priority Data
Mar. 10, 2017 (EP) .................... 17160245

(51) Int. Cl.
*A47J 31/06* (2006.01)
*A47J 31/44* (2006.01)
*B65D 85/804* (2006.01)

(52) U.S. Cl.
CPC ....... *A47J 31/0668* (2013.01); *A47J 31/0647* (2013.01); *A47J 31/4492* (2013.01); *B65D 85/8043* (2013.01)

(58) Field of Classification Search
CPC . A47J 31/0678; A47J 31/0626; A47J 31/4492
See application file for complete search history.

(56) References Cited

U.S. PATENT DOCUMENTS

| | | | |
|---|---|---|---|
| 9,907,425 B2 * | 3/2018 | Rivera | A47J 31/4492 |
| 2008/0187638 A1 * | 8/2008 | Hansen | B65D 85/8058 |
| | | | 426/433 |

(Continued)

FOREIGN PATENT DOCUMENTS

| | | |
|---|---|---|
| EP | 1440638 B1 | 7/2008 |
| EP | 1715778 A1 | 10/2010 |

(Continued)

OTHER PUBLICATIONS

International Search Report Corresponding to PCT/EP2018/053174 dated Mar. 13, 2018.

(Continued)

*Primary Examiner* — Nathaniel E Wiehe
*Assistant Examiner* — Spencer H. Kirkwood
(74) *Attorney, Agent, or Firm* — Finch & Maloney PLLC

(57) ABSTRACT

An adapter (1) for use in the preparation of a beverage by a capsule (2) and a beverage preparation device. The adapter (1) can be placed together with the capsule (2) in the beverage preparation device. The adapter (1) has a capsule face (4), on which mechanism (5) for introducing a liquid into the capsule (2) and mechanism (6) for discharging a liquid from the capsule (2) are located. In addition, the adapter (1) has a device face (7), on which an inlet (8) for a liquid provided by the beverage preparation device and an outlet (9) are located. The inlet (8) is fluidically connected to the mechanism (5) for introducing a liquid into the capsule (2) and the outlet (9) is fluidically connected to the mechanism (6) for discharging a liquid from the capsule (2).

40 Claims, 10 Drawing Sheets

(56) References Cited

U.S. PATENT DOCUMENTS

| | | | |
|---|---|---|---|
| 2011/0020499 A1* | 1/2011 | Richiger | B65D 85/8043 426/77 |
| 2014/0290493 A1* | 10/2014 | Rivera | A47J 31/407 99/295 |
| 2015/0327713 A1* | 11/2015 | Pruitt | B65D 85/8043 426/115 |
| 2016/0068334 A1* | 3/2016 | Cafaro | B65D 85/8049 426/115 |
| 2016/0174757 A1* | 6/2016 | Rivera | A47J 31/4492 99/284 |
| 2017/0166392 A1* | 6/2017 | Oh | A47J 31/407 |

FOREIGN PATENT DOCUMENTS

| | | | | |
|---|---|---|---|---|
| EP | 2 401 945 A1 | 1/2012 | | |
| EP | 2409609 A1 | 1/2012 | | |
| EP | 2709499 B1 | 3/2015 | | |
| EP | 3222557 A1 * | 9/2017 | | A47J 31/0668 |
| WO | 02082962 A1 | 10/2002 | | |
| WO | 2005/079638 A1 | 9/2005 | | |
| WO | 2010066705 A1 | 6/2010 | | |
| WO | 2011/058329 A1 | 5/2011 | | |
| WO | 2011069830 A1 | 6/2011 | | |
| WO | 2011092301 A1 | 8/2011 | | |
| WO | 2012/062842 A1 | 5/2012 | | |
| WO | 2013/072239 A1 | 5/2013 | | |
| WO | 2013/117990 A1 | 8/2013 | | |
| WO | 2013153526 A1 | 10/2013 | | |
| WO | WO-2017134544 A1 * | 8/2017 | | A23F 5/262 |

OTHER PUBLICATIONS

International Search Report Corresponding to PCT/EP2018/052345 dated Feb. 28, 2018.
International Search Report Corresponding to PCT/EP2018/056069 dated May 11, 2018.
Written Opinion Corresponding to PCT/EP2018/053174 dated Mar. 13, 2018.
Written Opinion Corresponding to PCT/EP2018/052345 dated Feb. 28, 2018.
Written Opinion Corresponding to PCT/EP2018/056069 dated May 11, 2018.
European Office Action issued in corresponding European Patent Application No. 17 160 245.1 dated Jul. 26, 2019.

* cited by examiner

ADAPTER FOR USE IN THE PREPARATION OF A BEVERAGE

The present invention relates to an adapter and a capsule for use in the preparation of a beverage by means of a beverage preparation device, wherein the adapter can be placed together with the capsule into the beverage preparation device.

A multiplicity of different portion packs and systems for producing beverages are known in the prior art. In particular, capsules are frequently used for preparing different hot beverages, especially coffee or tea, but also milkshakes, in the home. Such capsules, which are designed as disposable products, conventionally comprise a capsule body for receiving the beverage ingredients and a cover covering the capsule body. The ingredients are generally roasted and ground coffee beans, but sometimes are also dried tea leaves. However, soluble products in general or concentrates are also suitable. During the actual preparation, pressurized water is conducted through the capsule, as a result of which the material contained in the chamber is extracted or dissolved.

More recently, the number of commercially available beverage preparation systems based on capsules of the abovementioned type has increased significantly. Each of the systems generally comprises capsules of different configuration and size. In order to make it possible for a user to use a capsule of one system with a beverage preparation device of another system, various adapters are also obtainable. For example, EP 2 401 945 A1 describes an adapter device for a beverage preparation device. Said adapter device provides a receiving space which is adapted to the outer contour of a capsule and into which said capsule can be placed. After the receiving space has been closed with a cover, the adapter device together with the capsule can be placed into a capsule holder of the beverage preparation device, which capsule holder is designed for a different type of capsule. The adapter device provides means for introducing a liquid into the capsule and means for discharging a liquid from the capsule, which means correspond with the means of the beverage preparation device. This adapter device provides a possibility of using a capsule by means of beverage preparation devices of different systems.

However, said adapter device has the disadvantage of having to be of multi-part design because of the fact that the capsule is completely enclosed. Furthermore, the device leads to a comparatively large reduction in the available volume of the capsule holder. Also, it can be used only in combination with an individual type of capsule since the receptacle is adapted exactly to the outer contour of the capsule. Not least, the use of such an adapter device is awkward since, after the beverage has been prepared, the user has to open the adapter device in order to remove the capsule from the receptacle thereof.

It is therefore an object of the present invention to overcome the abovementioned disadvantages in the prior art. In particular, it is an object of the present invention to provide a diversely usable adapter for use in the preparation of a beverage by means of a capsule and a beverage preparation device, which adapter can be manufactured and used more simply. The adapter is intended in particular to provide greater user friendliness and can also be used if required in conjunction with various capsules of different size and/or different types.

These objects are achieved firstly by an adapter which has the features in claim 1. Said adapter is suitable for use in the preparation of a beverage by means of a capsule and a beverage preparation device, wherein the adapter can be placed together with the capsule into the beverage preparation device. The adapter has a capsule side on which means for introducing a liquid into the capsule and means for discharging a liquid from the capsule are arranged. The adapter furthermore has a device side on which an inlet for a liquid provided by the beverage preparation device and also an outlet are arranged. The inlet is fluidically connected to the means for introducing the liquid into the capsule and the outlet is fluidically connected to the means for discharging the liquid from the capsule.

Said adapter has the advantage that both the introduction of liquid into the capsule and the discharging of same from the capsule take place on only one side of the capsule. The adapter of said capsule therefrom thus does not have to completely encase the capsule and can be designed to be structurally significantly simpler. A complicated placing of the capsule into the adapter and later removal of said capsule therefrom is dispensed with. Furthermore, it is possible within certain limits to use capsules of different size and configuration with one and the same adapter since the size and shape of the capsule are not fixedly predetermined by said adapter. This makes it possible, inter alia, to adapt the quantity of a starting substance used with a capsule to the respective recipe in order to prepare a beverage.

The adapter can be substantially disk-shaped.

The capsule side can have an introducing region, in which the means for introducing the liquid into the capsule are arranged, and/or a discharging region, in which the means for discharging the liquid from the capsule are arranged. The introducing region and/or the discharging region can be bounded by at least one sealing element by means of which at least one tight connection to a contact surface of the capsule can be produced. As a result, an unintentional escape of liquid at the transition from the adapter to the capsule during the production of beverages can be effectively avoided. In particular, the introducing region and the discharging region can be separated from each other by at least one sealing element by means of which a tight connection to the contact surface of the capsule can be produced. An undesirable overflowing of liquid from the introducing region into the discharging region without passing through said capsule can thereby be effectively avoided.

The adapter, optionally including the sealing element, can be produced as a single piece, in two pieces or else three pieces, in particular by injection molding, preferably from a plastics material. By means of the single-piece design, the structural complexity of the adapter is further reduced, as a result of which the latter can be produced more cost-effectively. In particular, injection molding is very readily suitable for mass production.

The means for introducing the liquid into the capsule can be designed as at least one penetration element for penetrating the contact surface of the capsule. As a result, a liquid path into the capsule can be produced in a reliable manner. In particular, the means for introducing the liquid into the capsule can be designed as at least one hollow cannula. Such a hollow cannula is particularly readily suitable for introducing a liquid into the capsule since, after penetrating the contact surface, the liquid can be conducted through the hollow cannula into the interior of the capsule. However, the at least one penetration element can also be selected from a list consisting of a pyramid, a cone, a truncated pyramid, a truncated cone, a cylinder and a prism.

The at least one penetration element can be designed in such a manner that, when the capsule and the adapter are placed into the beverage preparation device and the device is closed, the contact surface of the capsule can be penetrated by the at least one penetration element. As a result, the penetration of the contact surface can be facilitated for the user since said penetration can take place using the beverage preparation device when the actual capsule holder is closed. Furthermore, the capsule is opened only immediately before the preparation of a beverage, which effectively avoids contamination or leaking of the contents thereof.

The means for discharging the liquid from the capsule can be designed as at least one, preferably a plurality of, penetration element(s), in particular selected from a list consisting of pyramids, cones, truncated pyramids, truncated cones, cylinders and prisms, for penetrating the contact surface of the capsule. Such penetration elements constitute an effective means for penetrating the contact surface and therefore for producing a liquid path for discharging the liquid from the capsule. If a plurality of penetration elements are used, the contact surface can be penetrated at a plurality of points. It has been established that the undesirable formation of preferred liquid paths within the starting substance in the interior of the capsule (what is referred to as channeling) can be avoided by the multiple penetration of the contact surface. As a result, good percolation of the starting surface contained in the capsule can be ensured.

The means for discharging the liquid from the capsule can be designed, in particular additionally, as at least one, preferably a plurality of, supporting element(s), in particular selected from a list consisting of pyramids, cones, truncated pyramids, truncated cones, cylinders and prisms. The at least one supporting element can be designed in such a manner that, after the capsule and the adapter are placed into the beverage preparation device, the contact surface of the capsule rests on the supporting element. By means of an internal pressure of the capsule that is built up during preparation of a beverage, the contact surface can then be brought to burst, in particular in addition to being penetrated when a beverage preparation device is closed. In this manner, in particular in the case of coffee beverages, particularly high quality can be obtained since the liquid is first introduced into the capsule and the starting substance is wetted by compression of the air contained in the capsule before a liquid path is created for discharging the liquid from the capsule. Furthermore, the burst and optionally additionally also penetrated contact surface can likewise take on the function of a filter element.

The means for discharging the liquid from the capsule, the outlet and optionally also the discharging region can be arranged in the center of the adapter. This makes it possible that, depending on the design of the beverage preparation machine, a receptacle for the prepared beverage, for example a coffee cup, can be placed in a manner centered centrally directly below the adapter and the capsule.

The means for introducing the liquid into the capsule, the inlet and optionally also the introducing region can be arranged in an edge region of the adapter. The means for introducing a liquid into the capsule are preferably designed as an in particular encircling duct or a channel. As a result, the center of the adapter can be kept free for other parts. Furthermore, when, for example, a plurality of puncture cannulas are used, better distribution of the liquid over the starting substance contained in the capsule can be obtained.

The capsule side of the adapter can have a structure for securing and/or positioning the capsule. Said structure can be designed in the form of an encircling collar. Such a structure ensures that the adapter is positioned correctly on the capsule for preparing a beverage. If the structure is additionally also designed for securing the capsule, adapter and capsule can be connected to each other before the preparation of a beverage and can be placed together as a unit into the beverage preparation device. This simplifies the handling of the adapter by a user.

The collar preferably comprises an indentation for engaging in a recess of the capsule. A desired mutual orientation of adapter and capsule can thereby also be ensured.

The structure can have latching means, in particular in the form of a groove and/or latching lug, to which the capsule can be latched, in particular at a flange-like edge, preferably at an encircling collar. The capsule can therefore be held in a standby position in which the contact surface of the capsule is held directly in front of the above-described penetration elements, wherein the contact surface of the capsule is penetrated only when the capsule and the adapter are placed into the beverage preparation device and the device is closed.

The outflow can have a constriction, in particular a gap for frothing a liquid discharged from the capsule. By means of this configuration of the outflow, an increased shearing action can be obtained during the passage of a liquid. In particular during the production of coffee beverages, this permits an improved crema, as is typical in particular of espresso beverages. If the constriction is designed in the form of a gap, this can additionally administer the function of a valve which opens only as the liquid pressure within the capsule increases and therefore prevents premature escape of the beverage. This permits in particular prebrewing of a starting substance in order to prepare a coffee beverage. The adapter accordingly avoids dispensing of the liquid drop by drop and permits only continuous dispensing. In particular, dripping of liquid after a beverage has been prepared can be avoided if the capsule together with the adapter is removed from the beverage preparation device.

The device side of the adapter can have at least one machine-readable code which can be read by a beverage preparation device, in particular for setting the operating parameters thereof, when the adapter is placed together with the capsule into the beverage preparation device.

Alternatively thereto, in the case of an adapter according to the invention, the capsule side can also have at least one machine-readable code which can be read by a beverage preparation device, in particular for setting the operating parameters thereof. For this purpose, the adapter can be in particular at least partially transparent in such a manner that the machine-readable code can be read by the beverage preparation device when the adapter is placed together with the capsule into the beverage preparation device.

As a result, in beverage preparation systems which make recourse to one or more machine-readable codes for setting the operating parameters of a beverage preparation device, a desired setting of the operating parameters can take place despite the use of an adapter. Furthermore, the provision of one or more machine-readable codes on the adapter has the advantage that different beverage preparation programs (i.e. sets of operating parameters; for example for espresso or lungo coffee) can be carried out using a single type of capsule. Greater flexibility can thus be obtained in the production of beverages. Furthermore, soiling of the machine-readable code, which may impair the readability thereof, can thus be avoided.

The machine-readable code can be a 1D or a 2D code. If the code is a 1D code, it can be a barcode. If the code is a 2D code, it can be a stacked code, for example a coda block, a code 49, or a PDF417. However, matrix codes, such as a QR code, a data matrix, a maxicode or an aztec code are also suitable. However, point codes or composite codes are also suitable. Although optoelectronically readable typefaces and color markings of tactile codings are also suitable, however, for use in combination with the present invention.

Alternatively thereto, the adapter can also have a window through which a machine-readable code mounted on the contact surface of the capsule can be read by the beverage preparation device, in particular for setting the operating parameters thereof, when the adapter is placed together with the capsule into the beverage preparation device. This configuration of the adapter ensures that, when a capsule is used, the correct parameters are always set at the beverage preparation device irrespective of the type of adapter used. Confusion which could result in the setting of erroneous operating parameters at the beverage preparation device is therefore effectively avoided.

Alternatively to the above-described design, the adapter can also be formed transparently at least in regions such that a machine-readable code mounted on the contact surface of the capsule can be read by the beverage preparation device, in particular for setting the operating parameters thereof, when the adapter is placed together with the capsule into the beverage preparation device.

The at least one machine-readable code, the at least one window or the at least one transparent region can be arranged with the device side in such a manner that a line which connects the inlet to the center of the machine-readable code, the window or the transparent region, and a line which connects the inlet to the outlet, are separated by a minimum angle spacing of 70°. By means of an angle spacing of the window or of the transparent region from the outlet of greater than or equal to 70°, soiling of the machine-readable code, the window or the transparent region can be particularly effectively avoided.

The present invention furthermore relates to a capsule for preparing a beverage with an adapter as described above and a beverage preparation device. The capsule can be placed together with the adapter into the beverage preparation device. The capsule comprises a capsule body with a flange-like edge to which a cover is attached, wherein the cover forms the contact surface of the capsule and closes the capsule body, in particular hermetically. The flange-like edge has an encircling collar which extends beyond the contact surface.

This configuration of the capsule is particularly advantageous if, depending on the configuration of the sealing elements on the adapter, a tight connection to the adapter also has to be produced at the outer edge of the capsule body. The invention is based on the finding that a tight connection between the capsule body and the adapter cannot be produced reliably if the cover lies between the sealing surfaces of said parts. Accordingly, the capsule according to the invention has, at the flange-like edge, an encircling collar which extends beyond the contact surface—and therefore also beyond the cover. A reliable tight connection between the adapter and the encircling collar can therefore be produced.

The present invention furthermore relates to a set comprising an adapter as described previously and at least one capsule for preparing a beverage, in particular a capsule as described previously. The at least one capsule here can comprise a contact surface which has a machine-readable code.

Such a set consisting of adapter and capsule affords the advantage in particular that the capsule can be constructed significantly more simply than capsules which are conventionally used in comparable applications. As a result, the process and the system for filling such a capsule with a starting substance turn out to be simpler. Furthermore, it is simpler to produce such a capsule in an oxygen-tight design.

For the configuration of a code mounted on the capsule, the same applies here as described above with respect to a code mounted on the adapter.

The capsule can comprise a capsule body and a cover which forms the contact surface of the capsule and closes the capsule body, in particular hermetically. The cover can be formed from a composite structure, in particular comprising an aluminum foil and a non-woven material. The aluminum foil imparts the tightness to the composite structure that is required to hermetically close the capsule body. By means of the use of a non-woven material in the composite structure, a filter function can additionally be obtained when the aluminum foil is penetrated or burst. Alternatively to said composite structure, a plastics film can also be used.

The capsule can contain a dry substance, in particular a coffee powder and/or a beverage concentrate. The capsule body can be produced from a plastics material, in particular by injection molding or thermoforming. These materials and methods have proven successful for producing capsule bodies.

The outer casing of the capsule can be oxygen- and/or aroma-tight. By means of an oxygen-tight design of the outer casing, penetrating of oxygen into the capsule during the storage of a starting substance contained therein can be substantially avoided. In a corresponding manner, aging of the starting substance, for example coffee powder, due to oxidation can be avoided. An oxygen-tight capsule is generally also aroma-tight. Flavorings contained in the starting substance are therefore substantially prevented from escaping during the storage of said starting substance inside the capsule.

Oxygen- and/or aroma-tightness is required in order, particularly in the case of coffee, to achieve a shelf life of 12 months, preferably 18 months. Accordingly, in the present connection, an oxygen- and/or aroma-tight capsule is understood as meaning a capsule in which coffee powder can be stored for a duration of at least 12 months, preferably at least 18 months, at room temperature in atmospheric air without a change to the coffee powder occurring that would significantly impair the quality of a coffee beverage produced therefrom.

The capsule body or the entire capsule can have a surface-modified oxygen transmission rate (OTR) in $cm^3$ per $m^2$ per day per 0.21 bar of less than 20, preferably less than 10, preferentially less than 5. The OTR indicates what amount of oxygen per surface and time unit diffuses through the capsule body.

In the case of a set according to the invention, the adapter can be preassembled on the capsule. This increases the user friendliness since a user merely has to place the preassembled unit of adapter and capsule into the beverage preparation device.

Furthermore, the present invention relates to a beverage preparation system comprising a set as described above and a beverage preparation device. In addition to the set as described above and the beverage preparation device, the beverage preparation system can additionally comprise at least one capsule which is suitable for use without an adapter.

Further advantages and individual features of the present invention emerge from the description below of a plurality of exemplary embodiments and from the drawings, in which, schematically:

Figure 1:
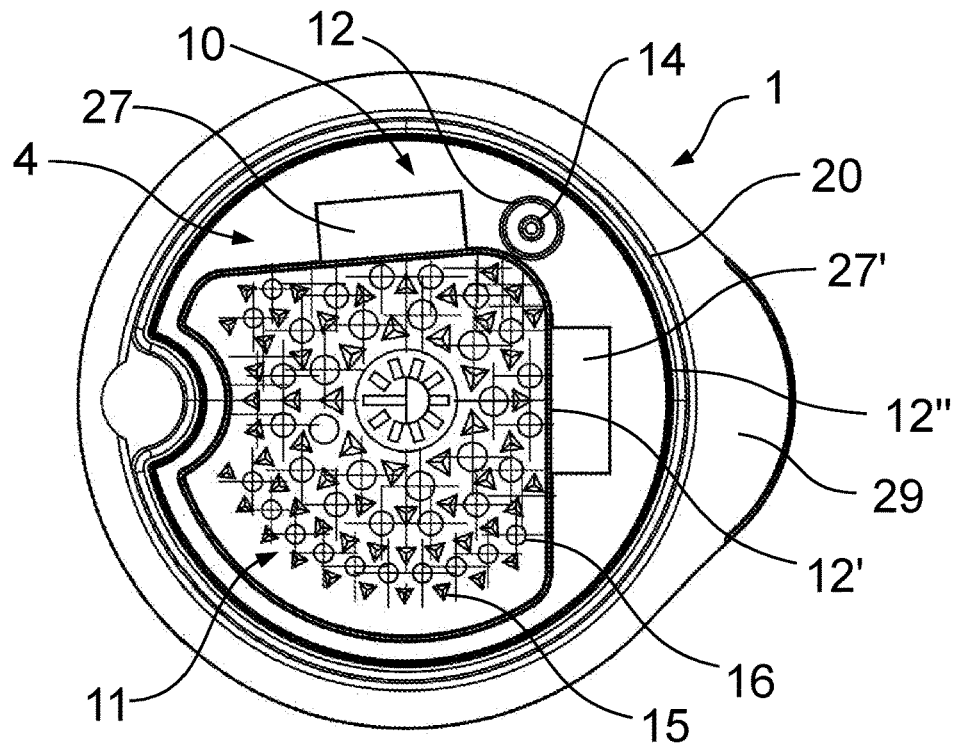
FIG. 1 shows a top view of an adapter from the capsule side.

FIG. 1 shows details of a capsule side 4 of an adapter according to the invention. It can be seen that the adapter 1 has a substantially circular shape and a tab 29. The tab 29 serves firstly as a gripping element for a user and secondly for aligning the adapter 1 in a beverage preparation device 3 (see FIG. 15). The capsule side 4 of the adapter 1 has an introducing region 10 and a discharging region 11. The discharging region 11 is surrounded by a sealing element 12'. Furthermore, a hollow cannula 14 as a means 5 for introducing a liquid into a capsule 2 (see FIG. 8) is arranged on the capsule side 4. The hollow cannula 14 is surrounded by a sealing element 12. The discharging region 11 has a multiplicity of penetration elements in the form of triangular pyramids 15 as discharging means 6. In addition to said pyramids 15, supporting elements in the form of truncated cones 16 are also arranged in the discharging region 11. For the positioning of a capsule on the adapter 1, the latter has an encircling collar 20. A further sealing element 12 is arranged along said collar 20. Furthermore, there are two transparent regions 27, 27' through which a code on the contact surface 13 (see FIG. 7) of a capsule placed onto the adapter 1 can be machine-read from the device side of the adapter 1.

Figure 2:
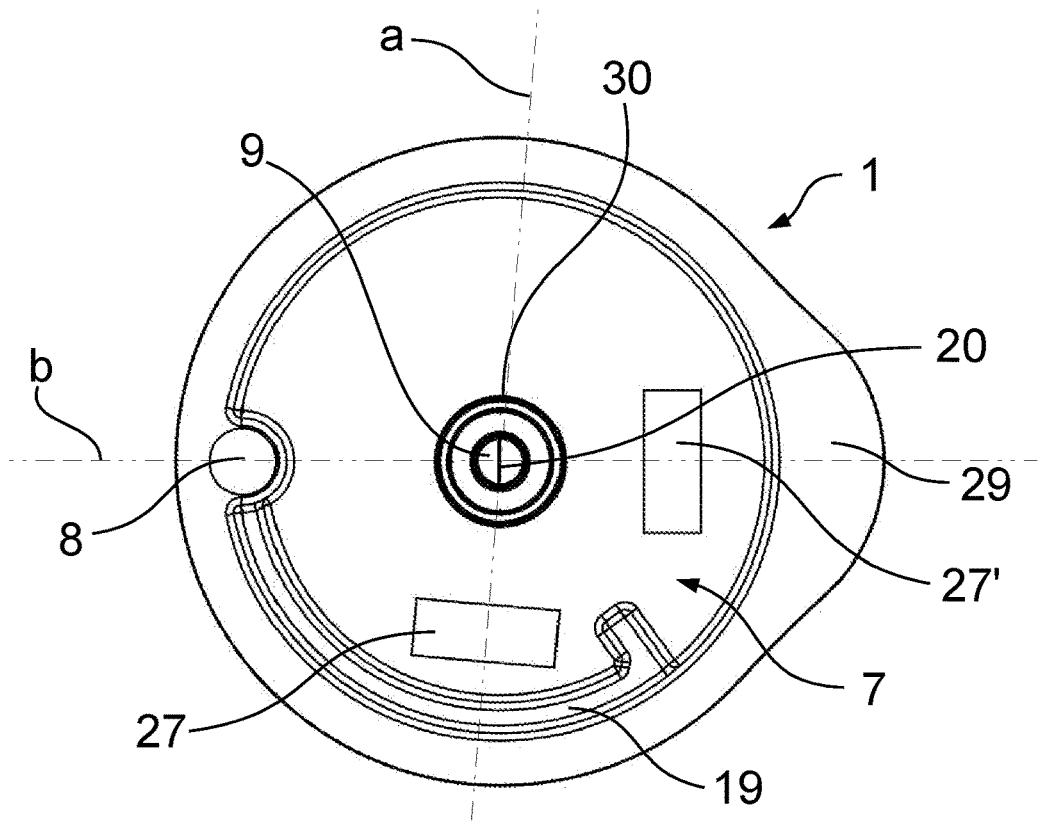
FIG. 2 shows a top view of an adapter from the device side.

FIG. 2 shows the device side 7 of the adapter 1 with the transparent regions 27, 27'. Furthermore, the outlet 9 which is surrounded by an encircling collar 30 can be seen. The inlet 8 of the adapter 1 is arranged in the periphery of the latter and opens into a duct 19, of which only the outer contour can be seen in the present figure. The transparent region 27 is arranged in such a manner that the line a which connects the inlet 8 to the center of the transparent region 27 and a line b which connects the inlet 8 to the outlet 9 are separated by an angle spacing of 85°.

Figure 3:
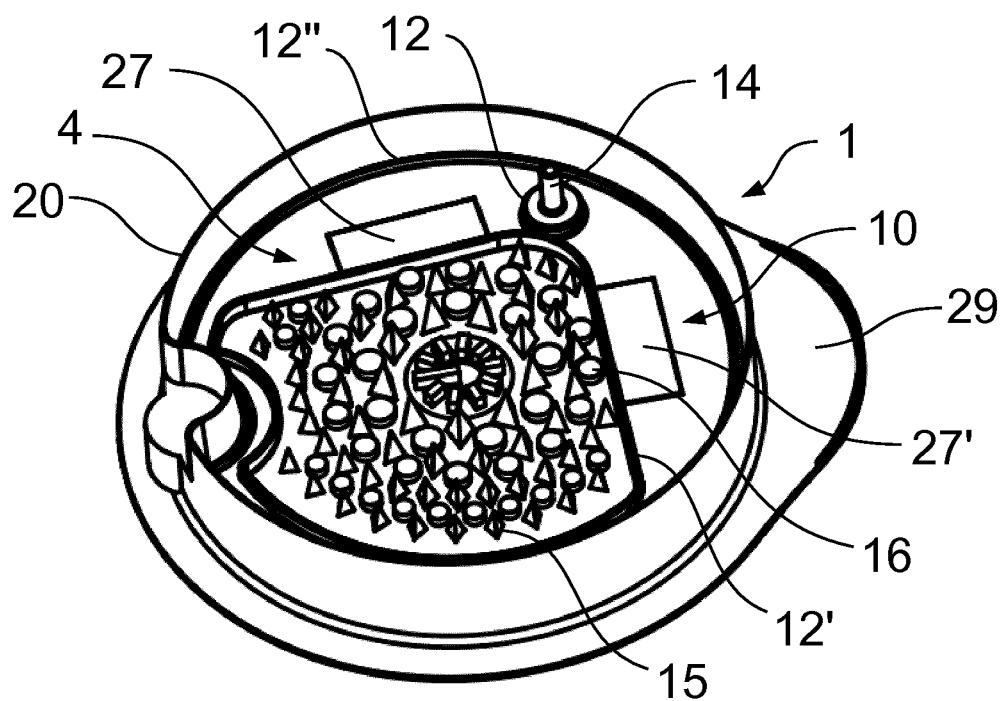
FIG. 3 shows a perspective illustration of an adapter from the capsule side.
Figure 4:
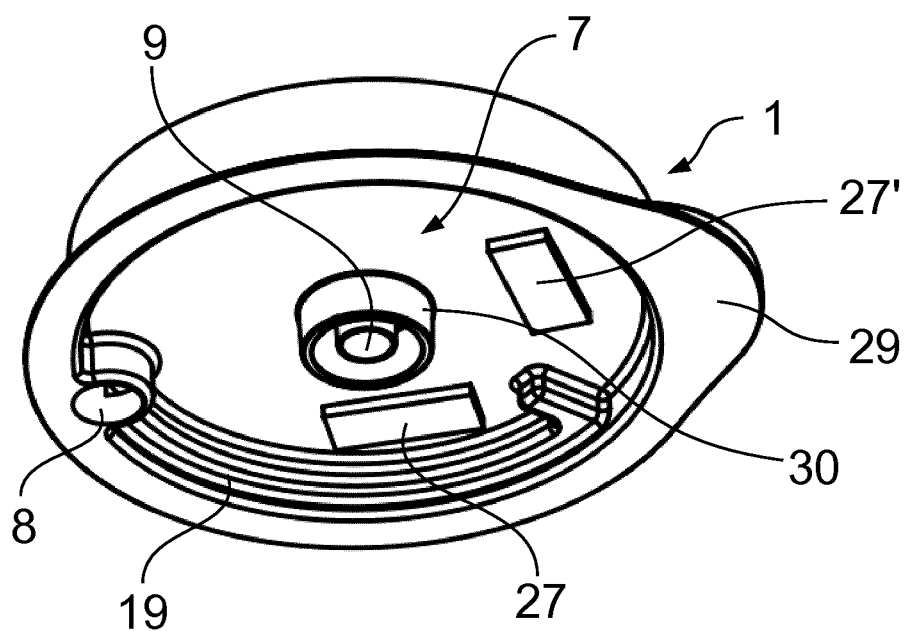
FIG. 4 shows a perspective illustration of an adapter from the device side.

FIGS. 3 and 4 additionally also show the capsule side and device side of the adapter 1 in a perspective illustration. It can be seen that the adapter 1 is substantially disc-shaped.

Figure 5:
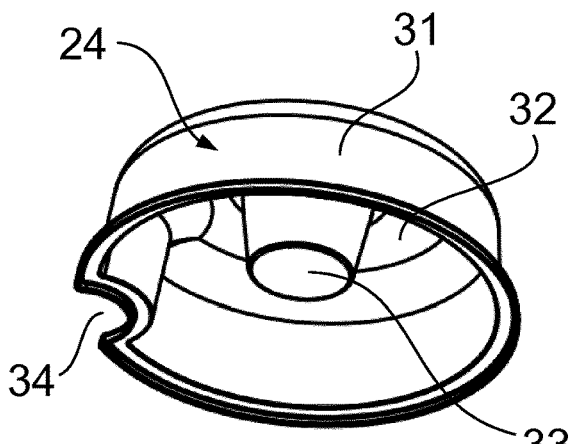
FIGS. 5 and 6 show perspective illustrations of the capsule body of a capsule for use with an adapter according to the invention.
Figure 6:
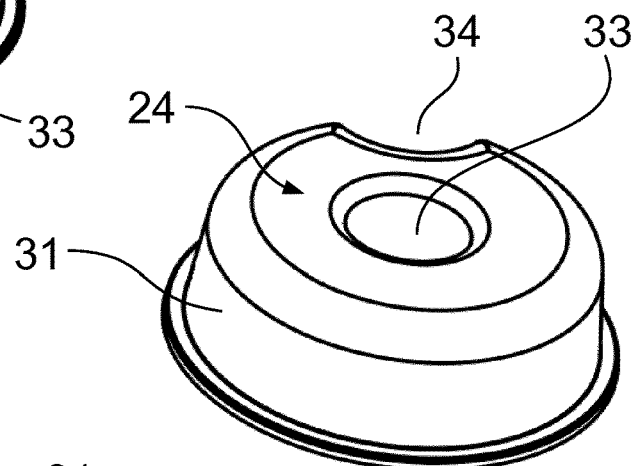

FIGS. 5 and 6 show a capsule body 24 for a capsule 2, which is provided for use with an adapter 1 according to the invention, from two different perspectives. The capsule body 24 comprises a side wall 31 and a base 32. The base 32 has a circular elevation 33. Furthermore, the side wall 31 and part of the base 32 is provided with a recess 34.

Figure 7:
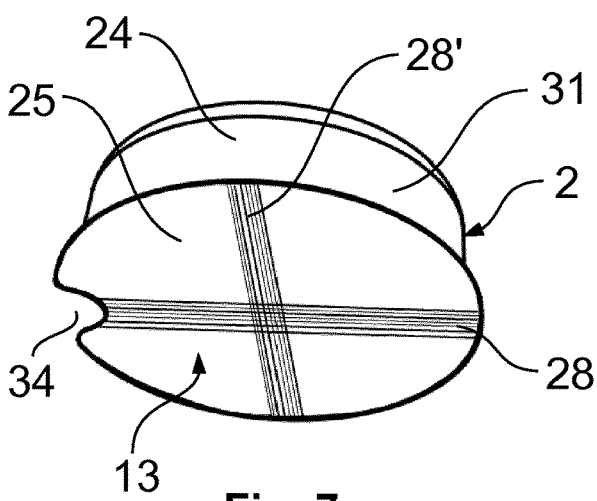
FIG. 7 shows a perspective illustration of a capsule for use with an adapter according to the invention.

FIG. 7 shows a capsule 2 for use with an adapter 1 according to the invention in the mounted state. The capsule body 24 is closed with a cover 25 which forms a contact surface 13 of the capsule 2. Two intersecting bar codes 28, 28' are printed on the cover 25. The capsule body 24 together with the cover 25 forms a receiving space for receiving a starting substance for producing a beverage.

Figure 8:
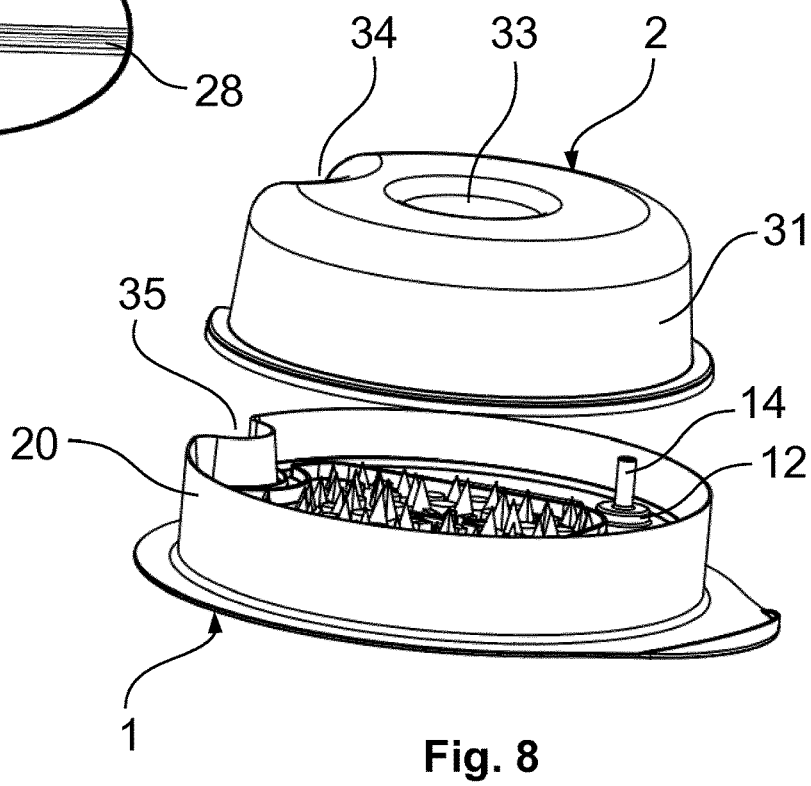
FIG. 8 shows a perspective overall view of an adapter according to the invention and a capsule provided for use with said adapter.

FIG. 8 shows the adapter 1 according to the invention and a capsule 2 provided for use with said adapter 1 in an overall view. It can be seen that the recess 34 of the capsule 2 corresponds to an indentation 35 of the encircling collar 20 of the adapter 1. In addition to an exact positioning of the capsule 2 on the adapter 1, a desired alignment of said capsule is therefore also obtained.

Figure 9:
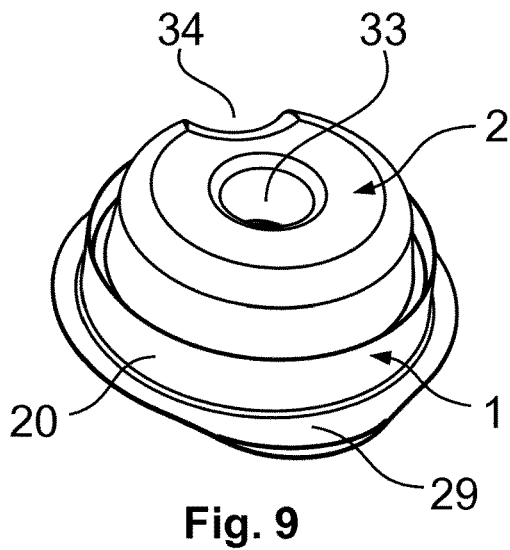
FIGS. 9 and 10 show perspective illustrations of an adapter according to the invention with a capsule placed thereon.
Figure 10:
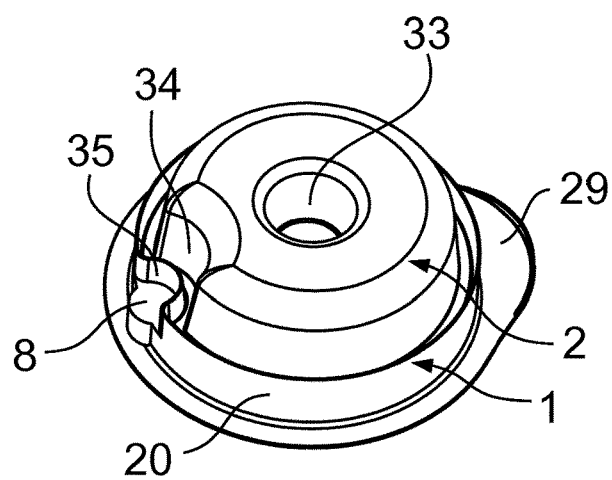

In FIGS. 9 and 10, the capsule 2 is placed onto the adapter 1. It can be seen in particular in FIG. 10 that the recess 34 of the capsule 2 and the indentation 35 of the encircling collar of the adapter 1 also provide the required space for the inlet 8.

Figure 11:
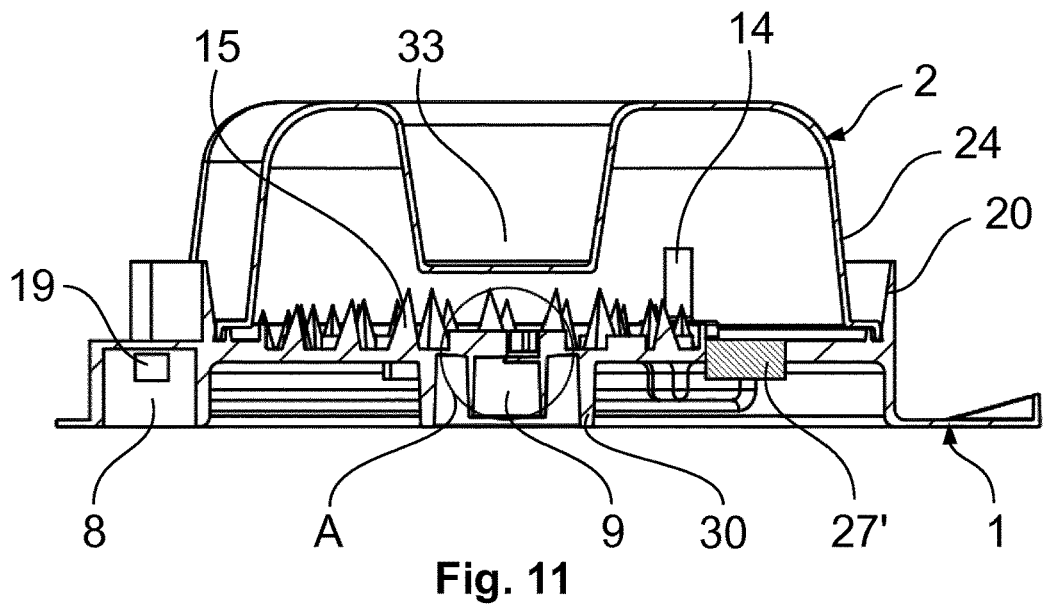
FIG. 11 shows a sectional view through the adapter according to the invention with a capsule according to FIGS. 9 and 10 placed thereon.

FIG. 11 shows a sectional view of the capsule 2 placed onto the adapter 1. For better clarity, the cover 25 of the capsule 2 is omitted. The sectional plane runs along the straight line b (cf. FIG. 2) through the inlet 8, the outlet 9 and the transparent region 27. It can readily be seen in the present illustration that the inlet 8 opens into the duct 19. It can also be seen that the transparent region 27' is formed by a cuboid element composed of a transparent material, which is inserted into a recess in the adapter 1.

Figure 12:
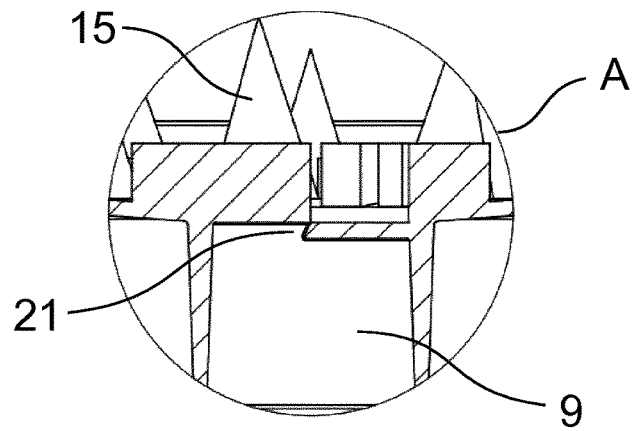
FIG. 12 shows an enlargement of the partial region A from FIG. 11.

FIG. 12 shows more precise details of the partial region A of FIG. 11. It can be seen that the opening for the liquid into the outlet 9 is designed as a gap 21. During the preparation of coffee beverages, said gap produces a crema typical of an espresso. Furthermore, the gap 21 carries out a valve function and can thus prevent an unintentional dripping of liquid after a beverage has been prepared, when the capsule together with the adapter is removed from the beverage preparation device. A pyramid-shaped penetration element 15 can likewise be clearly be seen in FIG. 12.

Figure 13:
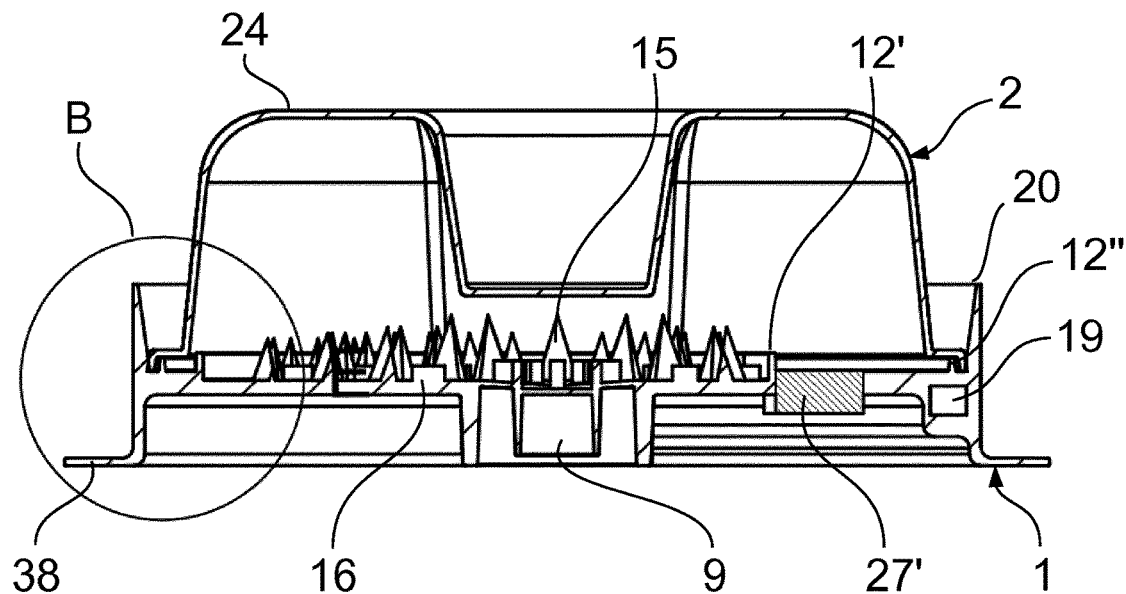
FIG. 13 shows an alternative sectional view of an adapter according to the invention with a capsule according to FIGS. 9 and 10 placed thereon.

FIG. 13 shows an alternative sectional view of a capsule 2, which is placed onto an adapter 1, according to FIGS. 9 and 10. In this case, the sectional plane runs along the straight line a which runs virtually perpendicularly to the straight line b (cf. FIG. 2). The transparent region 27' is correspondingly apparent here. Furthermore, a further portion of the duct 19 can be seen.

Figure 14:
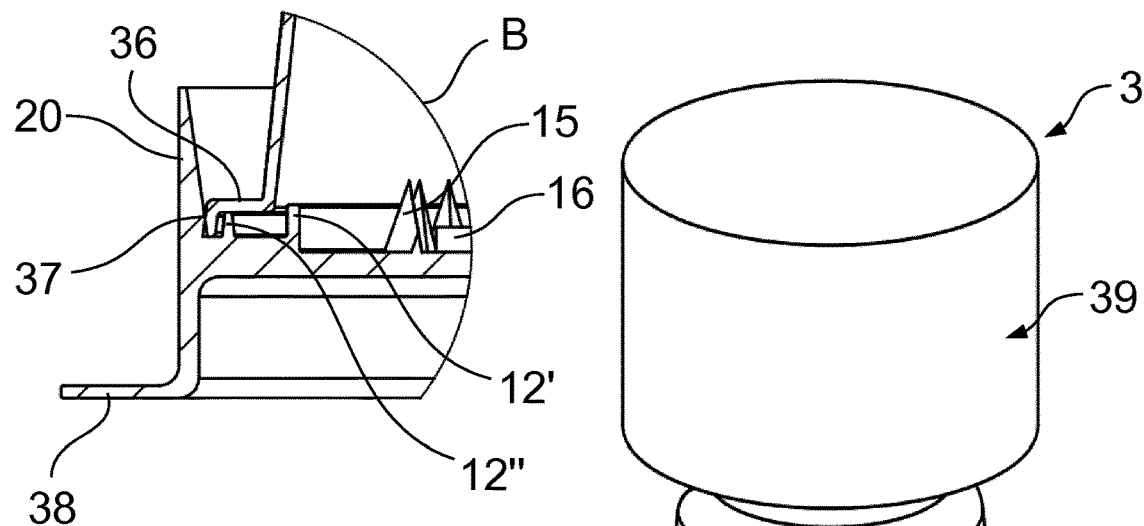
FIG. 14 shows an enlargement of the partial region B from FIG. 13.

FIG. 14 shows an enlargement of the partial region B according to FIG. 13. It can be seen that the capsule body 24 comprises a flange-like edge 36. An outer region of the latter has an encircling collar 37 which runs substantially parallel to the side wall 31 and extends beyond the contact surface 13. When the capsule 2 is placed onto the adapter 1 the collar 37 engages in a groove formed by the encircling collar 20 and the sealing element 12 of the adapter 1. The collar 20 of the capsule body 24 enters into a tight connection with the adapter 1. At the same time, the sealing element 12" enters into a tight connection with the capsule body 24. The cover 25 of the capsule 2 is omitted in FIGS. 13 and 14. However, it is provided to attach such a cover in a centered manner on the flange-like edge 36 of the capsule body 24 such that said cover does not fall between the sealing element 12" and the capsule body 24 or between the collar 37 and the adapter 1. It has been shown that this would significantly reduce the sealing action. In the case of the exemplary embodiment shown, it is provided that the cover 25 of the capsule 2 additionally enters into a tight connection with the sealing element 12'.

Figure 15:
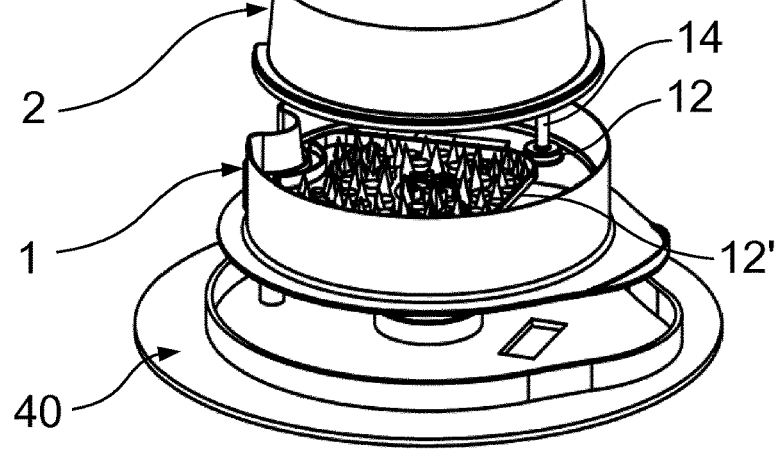
FIG. 15 shows a perspective overall view of an adapter according to the invention of a capsule provided for use with said adapter, and of a beverage preparation device (partially illustrated)

FIG. 15 shows a three-dimensional overall view of an adapter 1 according to the invention, of a capsule 2 and of the upper part 39 and the lower part 40 of a capsule holder of a beverage preparation device 3.

Figure 16:
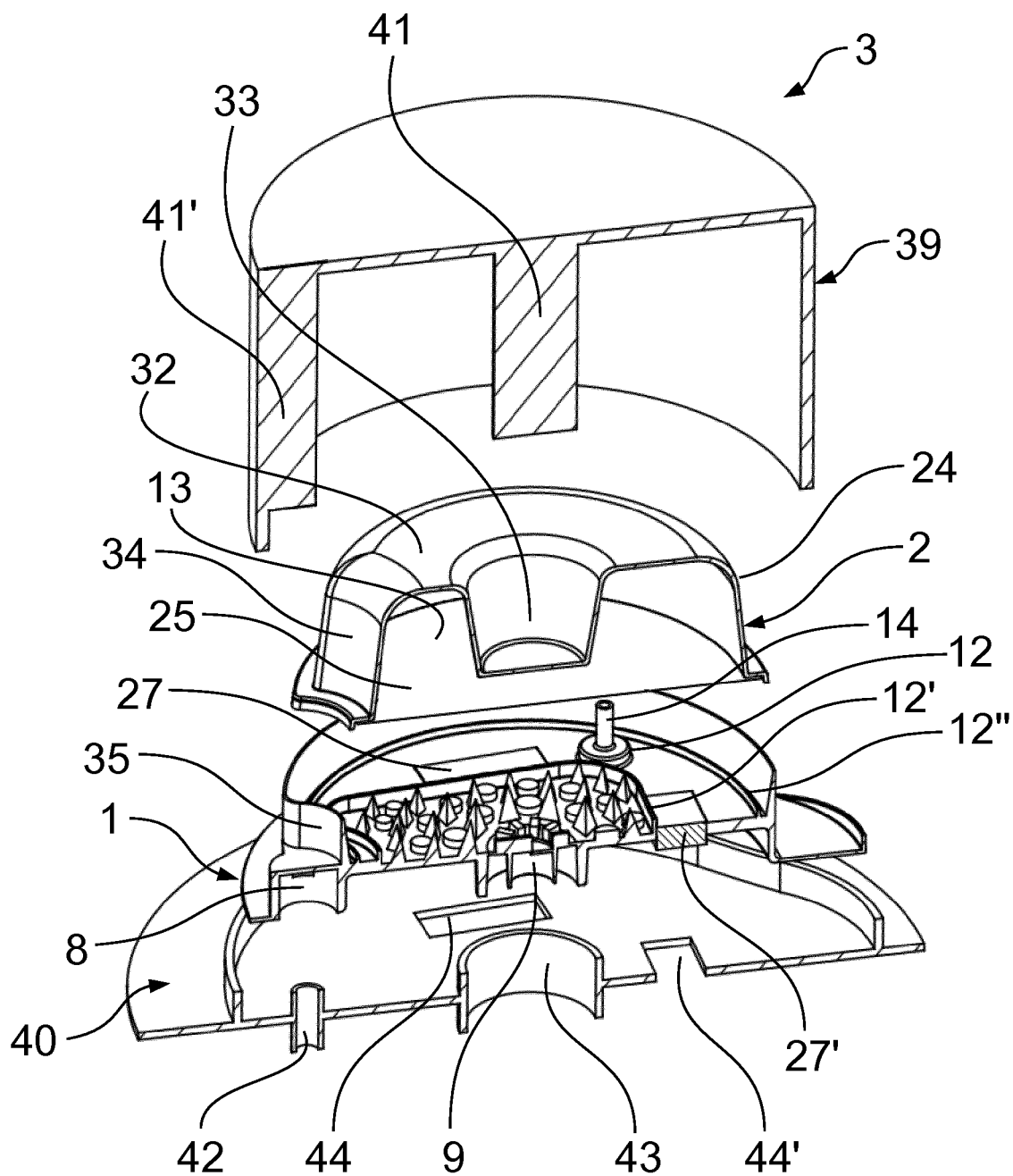
FIG. 16 shows a perspective sectional view of an overall view according to FIG. 15.

FIG. 16 shows a perspective sectional view of the overall view according to FIG. 15. It can be seen that the upper part 39 of the capsule holder has two punches 41, 41'. The punch 41 engages from the lower side in the elevation 31 of the base 32 of the capsule 2. The punch 41' engages in the indentation 35 of the encircling collar 20. The lower part 40 of the capsule holder has an inflow stub 42 which engages in the inlet 8 of the adapter 1 and via which a pressurized liquid can be provided. Furthermore, the lower part 40 of the capsule holder has an outflow stub 43 in which the outlet 9 of the adapter 1 can engage. The lower part 40 of the capsule holder furthermore has two reading windows 44, 44' via which a reading device which is part of the beverage preparation device 3 can read a machine-readable code, which is mounted on the contact surface 13 of the capsule 2, for example a bar code 28, 28' through the adapter 1.

Figure 17:
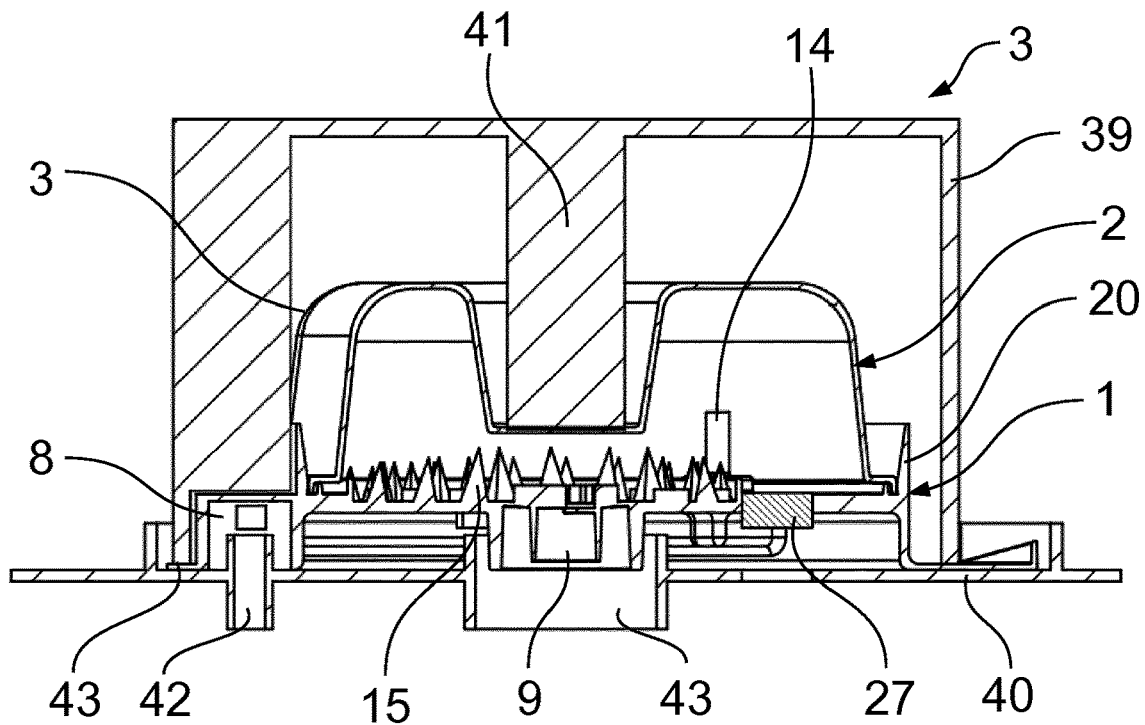
FIGS. 17 and 18 show sectional views of an adapter according to the invention and of a capsule placed thereon, placed into a beverage preparation device (partially illustrated) provided for this purpose.
Figure 18:
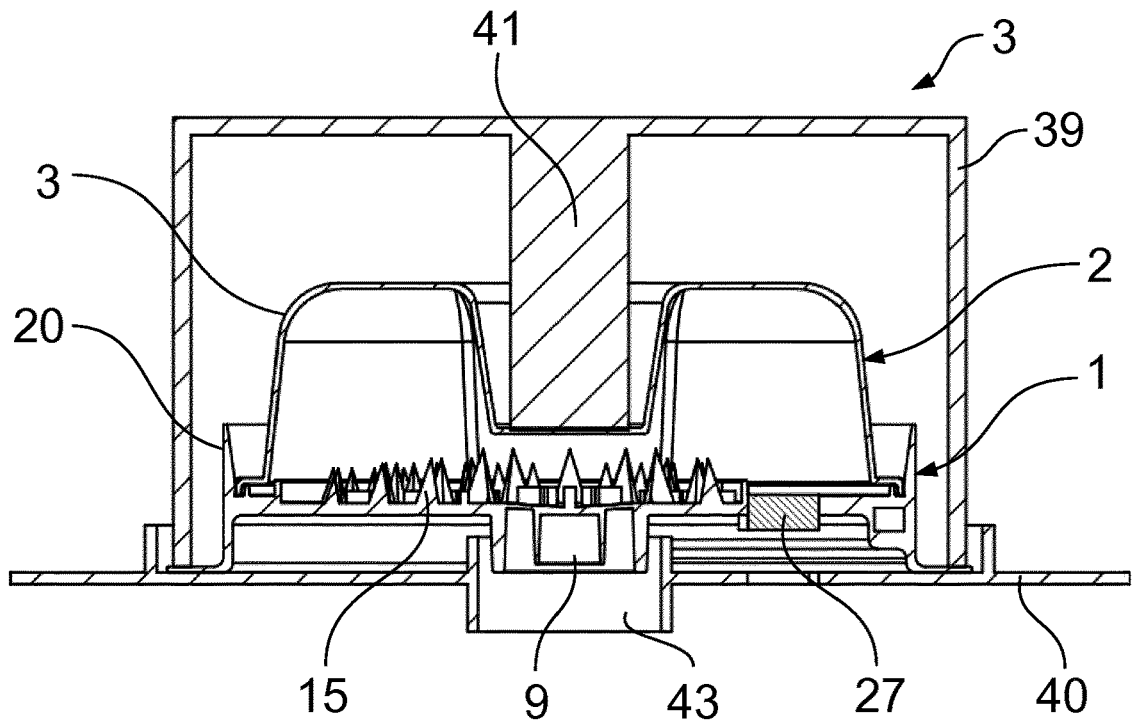

FIGS. 17 and 18 show the adapter 1 according to the invention with a capsule 2 in the capsule holder 39, 40 of a beverage preparation device 3 in the closed state. It can be seen that the flange-like edge 38 of the adapter 1 is clamped between the upper part 39 and the lower part 40 of the capsule holder, and therefore the latter is closed in a sealing manner. Furthermore, it can be seen how the punch 41 acts on the lower side of the elevation 33 in the capsule base 32. The capsule 2 is thus pressed onto the adapter 1, and therefore the sealing elements 12, 12', 12" and the encircling collar 37 together with the contact surface 13 (see FIG. 7) of the capsule 2 close in a sealing manner. Furthermore, the punch 41 presses onto the inlet 8 of the adapter 1. The transition from the inflow stub 42 to the inlet 8 is thus sealed. For better clarity, the cover 25 forming the contact surface 13 (see FIG. 7) of the capsule is omitted in FIGS. 17 and 18.

Figure 19:
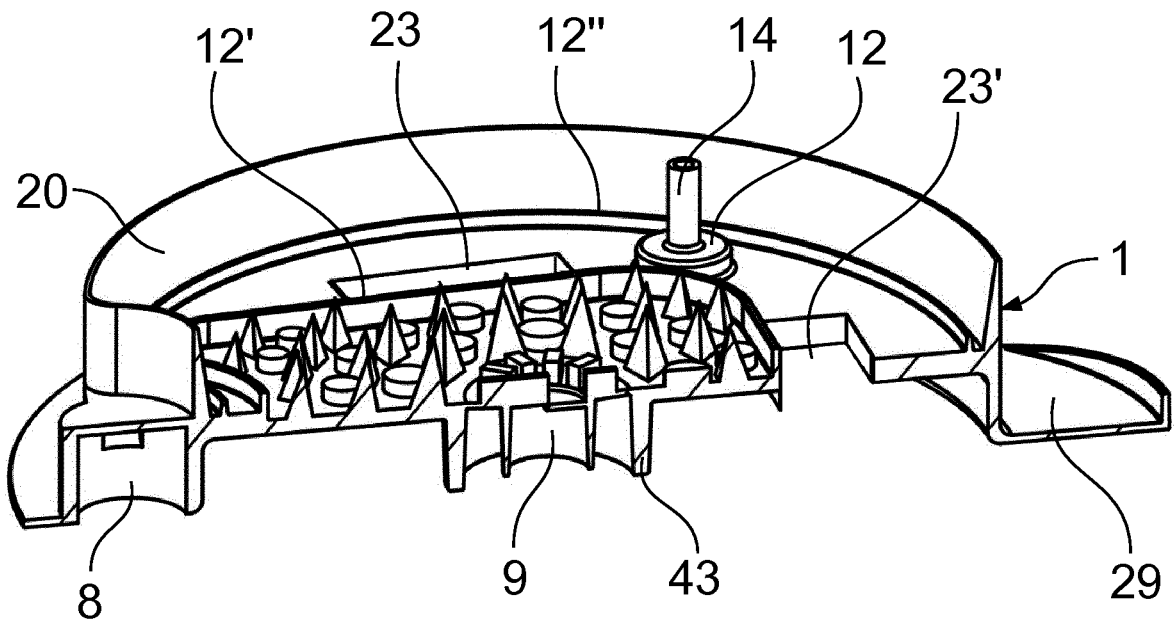
FIGS. 19 to 21 show various alternative embodiments of an adapter according to the invention.
Figure 20:
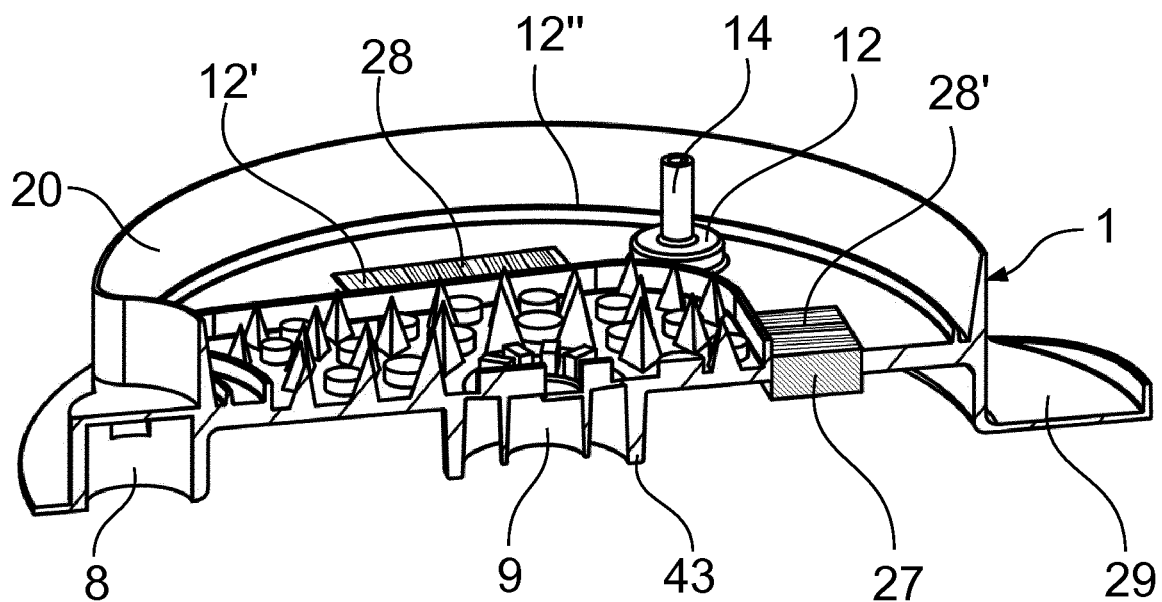
Figure 21:
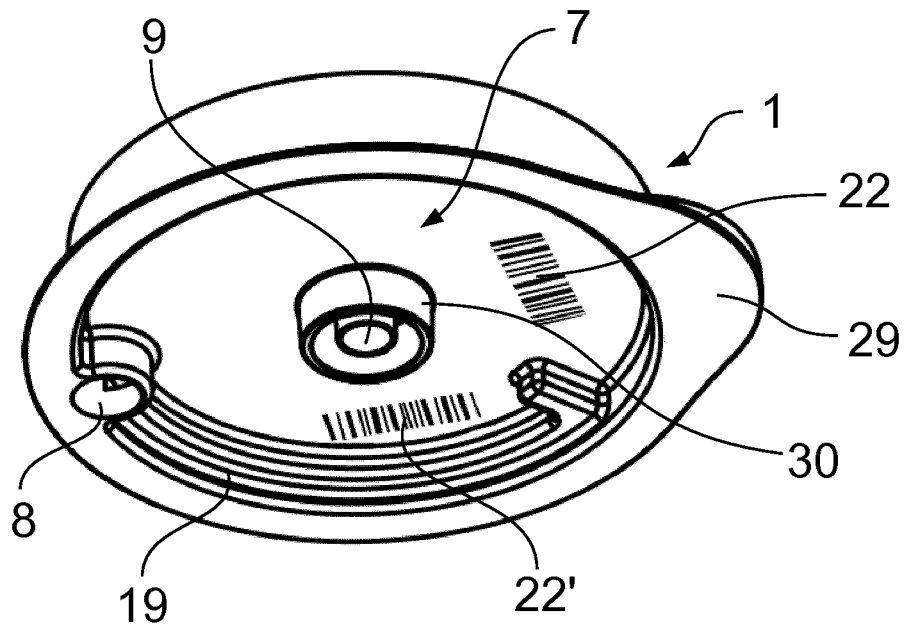
Figure 22:
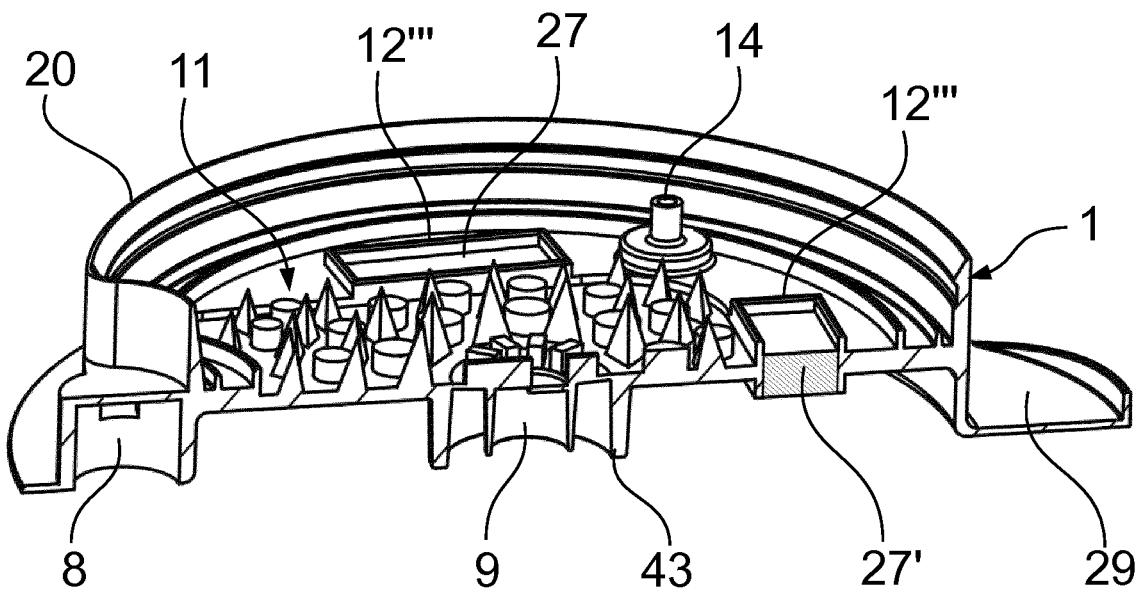
FIG. 22 shows a perspective sectional view of a further exemplary embodiment of an adapter according to the invention.
Figure 23:
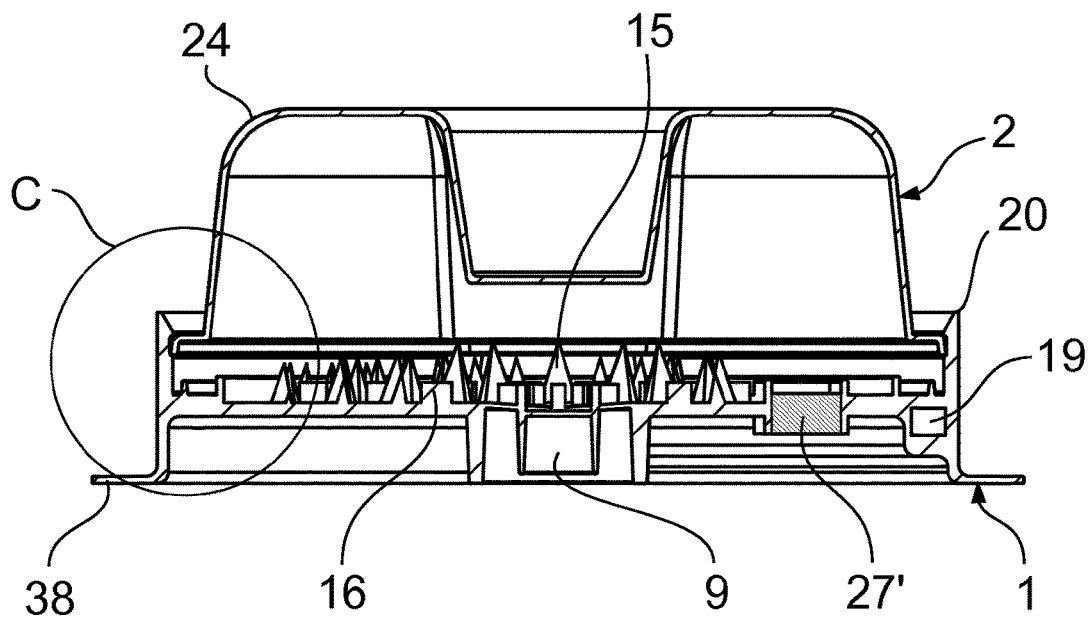
FIG. 23 shows a sectional view of the adapter according to FIG. 22 with a capsule place thereon.

FIGS. 19 to 21 show alternative embodiments of an adapter 1 according to the invention. In the example according to FIG. 19, the adapter 1 has windows 23, 23', through which a machine-readable code mounted on the contact surface 13 of the capsule 2 can be read by the beverage preparation device 3 when the adapter 1 is placed together with the capsule 2 into the beverage preparation device 3.

The example according to FIG. 20 shows an adapter 1 which, similarly to the exemplary embodiment according to FIGS. 1 to 18, has two transparent regions 27, 27' through which a machine-readable code can be read when the adapter is placed into the beverage preparation device. By contrast to the previously discussed exemplary embodiment (FIGS. 1 to 18), the machine-readable code here is not, however, printed on the capsule 2, but rather on the transparent regions 27, 27' of the adapter 1. In the exemplary embodiment according to FIG. 21, two machine-readable codes 22, 22' are printed directly onto the device side 7 of the adapter 1. In the exemplary embodiments shown, the machine-readable code 22 is an 1D code, namely a barcode. However, it goes without saying that the present invention is not restricted to such codes.

FIGS. 22 to 26 show a further exemplary embodiment of an adapter 1 according to the invention. This adapter 1 is used with the example according to FIGS. 1 to 18. However, a sealing element 12' is not arranged around the discharging region 11. Instead, the transparent regions 27, 27' are each surrounded by a sealing element 12'. However, it goes without saying that the present invention is not restricted to an adapter 1 with sealing elements 12' or 12''' which surround either the discharging region 11 or the transparent regions 27, 27' or windows 23, 23'. An adapter which has both sealing elements 12' which surround the discharging region 11 and sealing elements which surround the transparent regions 27, 27' or windows 23, 23' would also be conceivable.

Figure 24:
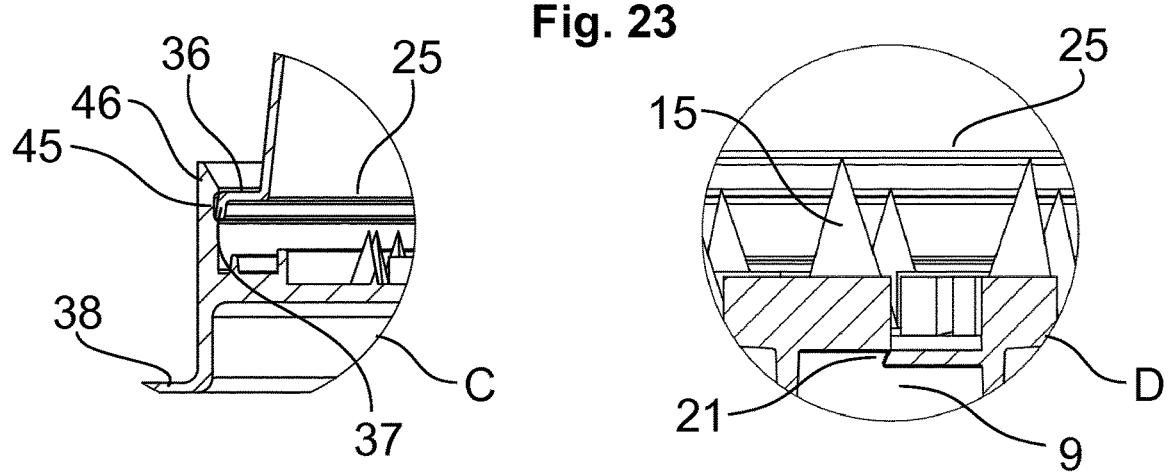
FIG. 24 shows an enlargement of the partial region C from FIG. 24.
Figure 26:
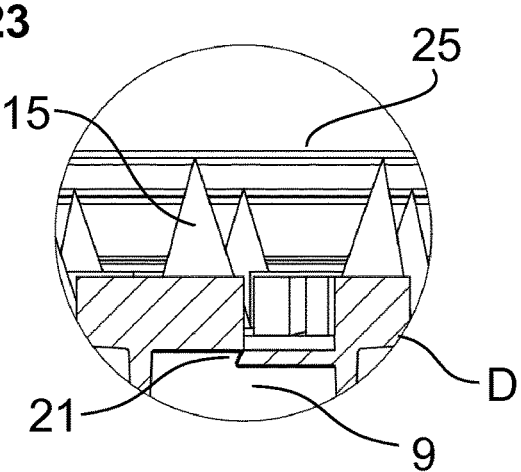
FIG. 26 shows an enlargement of the partial region D from FIG. 25.
Figure 25:
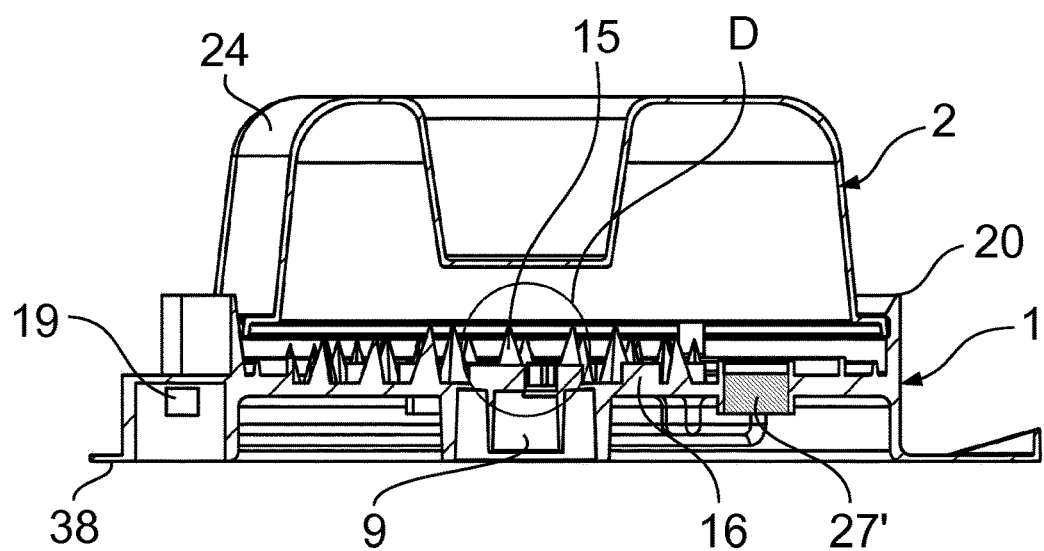
FIG. 25 shows a further sectional view of the adapter according to FIG. 22 with a capsule placed thereon.

As is apparent in particular from FIG. 24, in the case of this exemplary embodiment, the encircling collar 20 of the adapter 1 has latching means in the form of a groove 45 and a latching lug 46 to which the encircling collar 37 of the flange-like edge 36 of the capsule body 24 can be latched. The capsule 2 can therefore be held in a standby position (cf. FIGS. 23-26) in which the contact surface 13 of the capsule, in the present case formed by the cover 25, is held by the penetration elements described above. The cover 25 is penetrated only when the capsule 2 and the adapter 1 are placed into the beverage preparation device 3 and the device 3 is closed.

The invention claimed is:

1. An adapter for use in preparation of a beverage by a capsule and a beverage preparation device,
    wherein the adapter is configured to receive the capsule and to be inserted together with the capsule into the beverage preparation device,
    wherein the adapter does not encase the capsule, the adapter has a capsule side for receiving the capsule, and a device side to interact with the beverage preparation device,
    the adapter has arranged on its capsule side means for introducing a liquid into the capsule and means for discharging a liquid from the capsule,
    the adapter has arranged on its device side an inlet for receiving a liquid prepared by the beverage preparation device and also an outlet,
    the inlet is fluidically connected to the means for introducing the liquid into the capsule and the outlet is fluidically connected to the means for discharging the liquid from the capsule,
    wherein the means for introducing the liquid into the capsule are designed as at least one penetration element for penetrating a contact surface of the capsule, wherein the means for discharging the liquid from the capsule are designed as at least one penetration element for penetrating the contact surface of the capsule, wherein the at least one penetration element for introducing the liquid into the capsule and the at least one penetration element for discharging the liquid from the capsule are arranged such that the penetration of the contact surface of the capsule for both the introduction of the liquid into the capsule and the discharging of the same from the capsule take place on only one side of the capsule.

2. The adapter according to claim 1, wherein the capsule side has an introducing region, in which the means for introducing the liquid into the capsule are arranged, and/or a discharging region, in which the means for discharging the liquid from the capsule are arranged.

3. The adapter according to claim 1, wherein the means for discharging the liquid from the capsule are designed as at least one supporting element, and the at least one supporting element is designed in such a manner that, after the capsule and the adapter are placed into the beverage preparation device, the contact surface of the capsule rests on the supporting element, and, by an internal pressure of the capsule that is built up during preparation of a beverage, the contact surface of the capsule can be brought to burst.

4. The adapter according to claim 1, wherein the means for discharging the liquid from the capsule, the outlet and optionally also the discharging region are arranged in the center of the adapter.

5. The adapter according to claim 1, wherein the means for introducing the liquid into the capsule, the inlet and optionally also the introducing region are arranged in an edge region.

6. The adapter according to claim 1, wherein the capsule side has a structure for at least one of securing or positioning the capsule.

7. The adapter according to claim 1, wherein the device side has at least one machine readable code which is readable by a beverage preparation device, when the adapter is placed together with the capsule into the beverage preparation device.

8. The adapter according to claim 1, wherein the capsule side has at least one machine readable code, which is readable by a beverage preparation device, and the adapter is at least partially transparent in such a manner that the machine readable code can be read by the beverage preparation device when the adapter is placed together the capsule into the beverage preparation device.

9. The adapter as claimed in claim 1, wherein the adapter has at least one window through which a machine readable code mounted on the contact surface of the capsule is readable by the beverage preparation device, when the adapter is placed together with the capsule into the beverage preparation device.

10. The adapter according to claim 1, wherein the adapter is formed transparently at least in some regions such that a machine readable code mounted on the contact surface of the capsule is readable by the beverage preparation device, when the adapter is placed together with the capsule into the beverage preparation device.

11. A capsule for preparing a beverage with an adapter according to claim 1 and a beverage preparation device,
wherein the capsule is placeable together with the adapter into the beverage preparation device,
the capsule comprises a capsule body with a flange like edge to which a cover is attached,
the cover forms a contact surface of the capsule and closes the capsule body, and
the flange like edge has an encircling collar which extends beyond the contact surface.

12. A set comprising an adapter according to claim 1 and at least one capsule.

13. The adapter according to claim 2, wherein at least one of the introducing region or the discharging region is bounded by at least one sealing element by which at least one tight connection can be produced with a contact surface of the capsule.

14. The adapter according to claim 13, wherein the introducing region and the discharging region are separated from one another by the at least one sealing element by which a tight connection is produced with the contact surface of the capsule.

15. The adapter according to claim 1, wherein the means for introducing the liquid into the capsule are designed as at least one hollow cannula.

16. The adapter according to claim 1, wherein the at least one penetration element is designed in such a manner that, when the capsule and the adapter are placed into the beverage preparation device and the beverage preparation device is closed, the contact surface of the capsule is penetrated by the at least one penetration element.

17. The adapter according to claim 6, wherein the structure for at least one of securing or positioning the capsule is designed in the form of an encircling collar.

18. The adapter according to claim 6, wherein the structure has latching means to which the capsule can be latched.

19. A set comprising an adapter according to claim 6 and at least one capsule, wherein the adapter is preassembled on the capsule.

20. The adapter according to claim 17, wherein the encircling collar comprises an indentation for engaging in a recess of the capsule.

21. A set comprising an adapter according to in claim 17 and at least one capsule, wherein the adapter is preassembled on the capsule.

22. A set comprising an adapter according to claim 20 and at least one capsule, wherein the adapter is preassembled on the capsule.

23. The adapter according to claim 18, wherein the latching means are in the form of at least one of a groove or a latching lug, to which the capsule can be latched.

24. The adapter according to claim 7, wherein the at least one machine readable code is arranged on the device side in such a manner that a line which connects the inlet to a center of the at least one machine readable code and an other line which connects the inlet to the outlet are separated by a minimum angle spacing of 70°.

25. The adapter according to claim 8, wherein the at least one window is arranged on the device side in such a manner that a line which connects the inlet to a center of the at least one window and an other line which connects the inlet to the outlet are separated by a minimum angle spacing of 70°.

26. A set comprising an adapter according to claim 9 and at least one capsule, wherein the capsule has a machine readable code on the contact surface.

27. The adapter according to claim 9, wherein the at least one transparent region is arranged on the device side in such a manner that a line which connects the inlet to a center of the transparent region and an other line which connects the inlet to the outlet are separated by a minimum angle spacing of 70°.

28. A set comprising an adapter according to claim 10 and at least one capsule, wherein the capsule has a machine readable code on the contact surface.

29. The set according to claim 12, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

30. A beverage preparation system comprising a set according to claim 12 and a beverage preparation device.

31. The set according to claim 26, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

32. A beverage preparation system comprising a set according to claim 26 and a beverage preparation device.

33. The set as claimed in claim 28, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

34. A beverage preparation system comprising a set according to claim 28 and a beverage preparation device.

35. The set according to claim 19, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

36. A beverage preparation system comprising a set according to claim 19 and a beverage preparation device.

37. A set according to claim 21, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

38. A beverage preparation system comprising a set according to claim 21 and a beverage preparation device.

39. The set according to claim 22, wherein the capsule is placeable together with the adapter into the beverage preparation device, the capsule comprises a capsule body with a flange like edge to which a cover is attached, the cover forms the contact surface of the capsule and closes the capsule body, and the flange like edge has an encircling collar which extends beyond the contact surface.

40. A beverage preparation system comprising a set according to claim 22 and a beverage preparation device.

* * * * *